United States Patent
Nitsch et al.

(10) Patent No.: US 7,215,645 B2
(45) Date of Patent: May 8, 2007

(54) PROCEDURE FOR THE ESTIMATION OF PARAMETERS OF A CDMA-SIGNAL

(75) Inventors: Bernhard Nitsch, Munich (DE); Kurt Schmidt, Grafing (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 1072 days.

(21) Appl. No.: 10/209,708

(22) Filed: Aug. 1, 2002

(65) Prior Publication Data

US 2003/0081585 A1   May 1, 2003

(30) Foreign Application Priority Data

Aug. 8, 2001   (DE) ............................. 101 38 963

(51) Int. Cl.
*H04L 12/66* (2006.01)
(52) U.S. Cl. .................. 370/252; 370/342; 370/470; 370/479
(58) Field of Classification Search ............. 370/252, 370/342, 470, 479
See application file for complete search history.

(56) References Cited

U.S. PATENT DOCUMENTS 7,133,394 B2 * 11/2006 De et al. ................. 370/342

FOREIGN PATENT DOCUMENTS

DE   43 02 679 A1   8/1994

* cited by examiner

*Primary Examiner*—Hassan Kizou
*Assistant Examiner*—Jay P. Patel
(74) *Attorney, Agent, or Firm*—Caesar, Rivise, Bernstein, Cohen & Pokotilow, Ltd.

(57) ABSTRACT

The invention concerns a procedure for the estimation of unknown parameters ($\Delta\omega$, $\Delta\phi$, $\epsilon$, $g_a^{sync}$, $g_b^{code}$) of a received CDMA-signal ($r_{desc}(v)$) which is transmitted by means of a transmission channel (11), in which the CDMA-signal has experienced changes to the parameters ($\Delta\omega$, $\Delta\phi$, $\epsilon$, $g_b^{sync}$, $g_b^{code}$) with the following steps: (a) formation of a cost function (L), which is dependent on the estimated values ($\Delta\tilde{\omega}, \Delta\tilde{\phi}, \tilde{\epsilon}, \ldots$) of combined unknown parameters ($\Delta\omega, \Delta\phi, \epsilon, \ldots$); (b) partial differentiation of the cost function in respect to the said estimate values ($\Delta\tilde{\omega}, \Delta\tilde{\phi}, \tilde{\epsilon}, \ldots$) of the unknown parameters ($\Delta\omega, \Delta\phi, \epsilon, \ldots$); (c) formation of a matrix-vector-equationfrom the presupposition that all partial differentials of the cost function are zero and thus a minimum of the cost function exists, and (d) computation of at least some of the matrix elements of the matrix elements of the matrix-vector-equation with the use of the Fast-Hadamard-Transformation.

11 Claims, 2 Drawing Sheets

US 7,215,645 B2

PROCEDURE FOR THE ESTIMATION OF PARAMETERS OF A CDMA-SIGNAL

BACKGROUND OF THE INVENTION

The invention concerns a procedure for the estimation of the parameters of a CDMA (Code Division Multiple Access) Signal and also concerns a corresponding computer program. The parameters to be estimated are, for instance, the time-shift, the frequency-shift and the phase-shift, to which the CDMA signal is subjected in the transmission signal and the gain factors.

As to the present state of the technology, one can refer to DE 43 02 679 A1, wherein a procedure for instantaneous frequency detection for a complex base-band is disclosed. This known procedure does not, however, adapt itself to the simultaneous determination of the time-shift and the phase-shift and further, this known procedure requires, in the case of broadband signals, a high investment in implementation.

All references cited herein are incorporated herein by reference in their entireties.

BRIEF SUMMARY OF THE INVENTION

Thus the invention has the purpose of creating a procedure for the estimation of parameters of a CDMA signal and a corresponding computer program, which calls for a small numerical complexity and a small cost in time and equipment, i.e., a small computational time.

The basis of the invention is, that by means of the employment of the Fast Hadamard-Transformation for computation of the coefficients, the numerical complexity can be substantially reduced.

BRIEF DESCRIPTION OF SEVERAL VIEWS OF THE DRAWINGS

An embodiment of the invention given below is described in more detail with reference to the drawings, wherein.

DETAILED DESCRIPTION OF THE INVENTION

In the following, the invented procedure is more closely described with the aid of an example embodiment. In the case of the following mathematical presentation, the following formula symbols are used:

| | |
|---|---|
| $\epsilon$ | Time shift |
| $\hat{\epsilon}, \tilde{\epsilon}$ | Estimated value of the time shift |
| $\Delta\omega$ | Frequency shift |
| $\Delta\hat{\omega}, \Delta\tilde{\omega}$ | Estimated value of the frequency shift |
| $\Delta\phi$ | Phase shift |
| $\Delta\hat{\phi}, \Delta\tilde{\phi}$ | Estimated value of the phase shift |
| v | Time Index on the chip surface |
| $c_b(v)$ | Normed capacity, unscrambled chip signal of the b-ten code channel. |
| $g_b^{code}$ | Gain factor |
| $g_a^{sync}$ | Gain factor of the a-ten Synchronization Channel |
| j | Square root of minus one |
| l | Time index on symbol plane |
| n(v) | Additive disturbance |
| $r_{desc}(v)$ | Unscrambled Measurement Signal |
| $r_b(l)$ | Capacity normalized, undisturbed symbol of the b-ten code channel, which uses the b-ten spread code |
| REAL{...} | Real Part Operator |
| $S_{desc}(v)$ | Unscrambled reference signal |
| $sync_a(v)$ | Capacity normalized, unscrambled chipsignal of the a-ten synchronization channel. |
| $SF_b$ | Spreadfactor of the b-ten code channel |
| $w_b(v)$ | Spreadcode of the b-ten code channel |
| x(v) | Chipsignal, which if employed for the Fast Hadamard-Transformation. |
| $x_b(l)$ | Symbol signal, as a result of the Q-ten stage of the Fast Hadamard-Transformation. The symbols were spread with a spread code of the code class Q and the code number b. | x(v) Chipsignal, which if employed for the Fast Hadamard Transformation.

Xb(l) Symbol signal, as a result of the Q-ten stage of the Fast Hadamard-Transformation. The symbols were spread with a spread code of the code class Q and the code number b.

Figure 1:
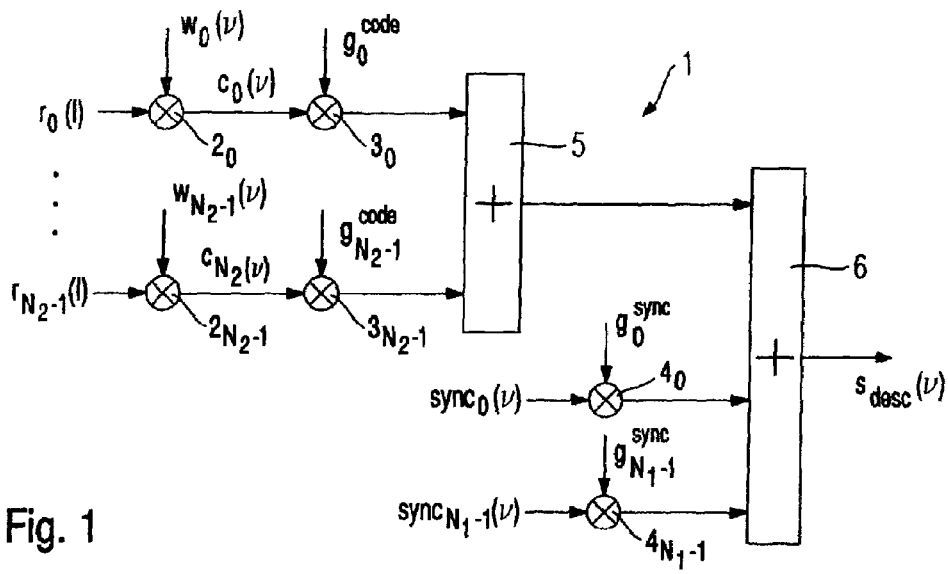
FIG. 1 is a block circuit diagram of a sender-model based on the invention procedure.

In the following is described an estimation procedure for the approximation of unknown parameters which exhibit a small degree of complexity. This procedure is, in the case of the mobile function, that is to say, is operable in accord with the standards 3 GPP and CDMA2000, or generally by all mobile radio systems which employ "Orthogonal Variable Spreading Factor Codes" or "Wash-codes" as a spreading sequence. In FIG. 1, the block circuit diagram of the model of the sender 1 is based on the invented procedure. The symbols $r_b(l)$ of different code channels are separated by means of orthogonal spreading codes $w_b(v)$. The symbols $r_b(l)$ and the spreading codes $w_b(v)$ are spread upon the multiplier $2_o$ to $2_{N2}$. Each code channel can possess a different gain factor $g_b^{code}$ which is fed to a multiplier $3_o$ to $3_{N2}$. As synchronization channels, unscrambled synchronization-chip-signals $sync_a(v)$ were sent which possess the gain factors $g_a^{sync}$ which are fed to the multipliers $4_o$ to $4_{N1}$. The codes $sync_a(v)$ of the synchronization channels are not orthogonal to the spreading codes $w_b(v)$. The unscrambled reference signal $s_{desc}(V)$ is the sum of the signals of all $N_2$ code channels and the signals of all $N_1$ synchronization channels and are created by the addition units 5 and 6.

Figure 2:
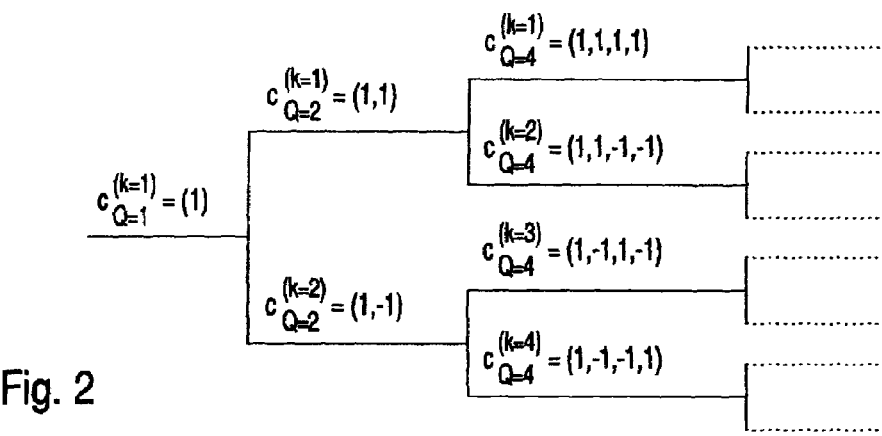
FIG. 2 is the code tree of a OVSF (Orthogonal Variable Spreading Factor) usable in the invented procedure (Spread Codes)

The spread code, used in the embodiment example, as these are presented in FIG. 2, are "Orthogonal Variable Spreading Factor Codes" (OVSF) and can have their origins from different code classes. The code-tree is, for instance, described in more detail in T. Ojampera, R. Prasad, "Wideband CDMA for Third Generation Mobile Communications", Artech House, ISBN 0-89006-735-x, 1998, pages 111–113.

In the WCDMA-System in accord with 3GPP in general, the summation signal from the code channels is unscrambled by an unscrambling code. The synchronization channels are not scrambled. This fact is given consideration in the employed sender model, since the model describes the generation of a unscrambled sender signal $s_{desc}(v)$. In consideration of this, the synchronization channels send unscrambled code sequences $\text{sync}_a(v)$.

Figure 3:
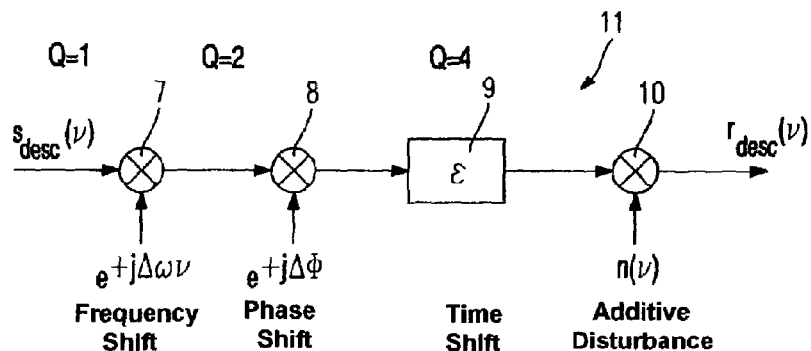
FIG. 3 is the block circuit diagram of a model based on the invented procedure of the transmission channel.

The model of the transmission channel 11, as shown schematically in FIG. 3, takes into consideration an additive disturbance $n(v)$, a normalized time-shift on the chip period $\Delta\omega$ and a phase-shift $\Delta\phi$ which bias the scrambled reference signal, and repeats itself in the measurement signal:

$$r_{desc}(v) = s_{desc}(v+\epsilon) \cdot e^{+j\Delta\omega(v+\epsilon)} \cdot e^{+j\Delta\phi} + n(v) \quad (1)$$

In the block circuit drawing are provided, on this account, two multipliers 7 and 8, a time delay element 9 and an addition device 10.

For the in-common-estimation of all unknown parameters, that is, the timeshift $\epsilon$, the frequency-shift $\Delta\omega$, the phase-shift $\Delta\phi$ and the gain factors $g_a^{sync}$ and $g_b^{code}$ of the synchronization or code channel, a maximum-likelihood-approximation procedure is employed, which uses the following cost function:

$$L_1(\Delta\tilde{\omega}, \Delta\tilde{\phi}, \tilde{\epsilon}, \tilde{g}_a^{sync}, \tilde{g}_b^{code}) = \quad (2)$$

$$\sum_{v=0}^{N-1} \left| r_{desc}(v-\tilde{\epsilon}) \cdot e^{-j\Delta\tilde{\omega}v} \cdot e^{-j\Delta\tilde{\phi}} - \sum_{a=0}^{N_1-1} \tilde{g}_a^{sync} \cdot \text{sync}_a(v) - \sum_{b=0}^{N_2-1} \tilde{g}_b^{code} \cdot c_b(v) \right|^2$$

wherein $\text{sync}_a(v)$ denotes the complex value, unscrambled, capacity normalized, undeformed chip-signal of the a-ten synchronization channel, also $c_b(v)$ stands for the complex valued, unscrambled, capacity normalized, chip-signal of the b-ten code channel $g_a^{sync}$ of the gain factor of the a-ten synchronization channel and $g_b^{code}$ represents the gain factor of the b-ten code channel.

For the minimizing of the cost function, this is linearized, in which process a series development of the first order of the exponential function, as well as the measuring signal is used:

$$L(\Delta\tilde{\omega}, \Delta\tilde{\phi}, \tilde{\epsilon}, \tilde{g}_a^{sync}, \tilde{g}_b^{code}) = \sum_{v=0}^{N-1} \left| r_{desc}(v) - jr_{desc}(v) \cdot \Delta\tilde{\omega} \cdot v - \right. \quad (3)$$

$$\left. jr_{desc}(v) \cdot \Delta\tilde{\phi} - r'_{desc}(v) \cdot \tilde{\epsilon} - \sum_{a=0}^{N_1-1} \tilde{g}_a^{sync} \cdot \text{sync}_a(v) - \sum_{b=0}^{N_2-1} \tilde{g}_b^{code} \cdot c_b(v) \right|^2$$

The cross terms between the unknown parameters are neglected, so that the minimizing of the cost function with a linear equation can be undertaken. This is reliable, as long as the unknown parameters are small, which, if necessary, can be attained by several reiterations. This means that the here presented method can be applied only for the more refined approximating.

For the computation of the partial derivatives of the linearized cost function in accord with the unknown parameters, the following formulations are employed: An unknown parameter x is a real value number, the constants c and d are complex numbers and a cost function employed as a squared amount:

$$L = |c \cdot x + d|^2 = (c \cdot x + d) \cdot (c \cdot x + d)^* = |c|^2 \cdot x^2 + c^* \cdot d \cdot x + c \cdot d^* \cdot x + |d|^2 \quad (4)$$

Now, the partial differential may be computed:

$$\frac{\partial L}{\partial x} = 2 \cdot |c|^2 \cdot x + 2 \cdot \text{REAL}\{c \cdot d^*\}. \quad (5)$$

With equation 5, the partial derivative with respect to the frequency shift to:

$$\frac{\partial L}{\partial \Delta\hat{\omega}} = 2 \sum_{v=0}^{N-1} |r_{desc}(v)|^2 \cdot v^2 \cdot \Delta\hat{\omega} + 2 \sum_{v=0}^{N-1} \text{REAL}\{-j \cdot r_{desc}(v) \cdot v \cdot a_0^*(v)\} = 0 \quad (6)$$

with the following $$a_0(v) = r_{desc}(v) - jr_{desc}(v) \cdot \Delta\hat{\phi} - \quad (7)$$

$$r'_{desc}(v) \cdot \hat{\epsilon} - \sum_{a=0}^{N_1-1} \hat{g}_a^{sync} \cdot \text{sync}_a(v) - \sum_{b=0}^{N_2-1} \hat{g}_b^{code} \cdot c_b(v),$$

the partial derivative with respect to the phase shift, to $$\frac{\partial L}{\partial \Delta\hat{\phi}} = 2 \sum_{v=0}^{N-1} |r_{desc}(v)|^2 \cdot \Delta\hat{\phi} + 2 \sum_{v=0}^{N-1} \text{REAL}\{-j r_{desc}(v) \cdot a_1^*(v)\} = 0 \quad (8)$$

with $$a_1(v) = r_{desc}(v) - jr_{desc}(v) \cdot \Delta\hat{\omega} \cdot v - \quad (9)$$

$$r'(v) \cdot \hat{\epsilon} - \sum_{a=0}^{N_1-1} \hat{g}_a^{sync} \cdot \text{sync}_a(v) - \sum_{b=0}^{N_2-1} \hat{g}_b^{code} \cdot c'_b(v),$$

the partial derivative with respect to the time shift, to $$\frac{\partial L}{\partial \hat{\epsilon}} = 2 \sum_{v=0}^{N-1} |r'_{desc}(v)|^2 \cdot \Delta\hat{v} + 2 \sum_{v=0}^{N-1} \text{REAL}\{-r'_{desc}(v) \cdot a_2^*(v)\} = 0 \quad (10)$$

with $$a_2(v) = r_{desc}(v) - jr_{desc}(v) \cdot \Delta\hat{\omega} \cdot v - \quad (11)$$

$$jr'_{desc}(v) \cdot \Delta\hat{\phi} - \sum_{a=0}^{N_1-1} \hat{g}_a^{sync} \cdot \text{sync}_a(v) - \sum_{b=0}^{N_2-1} \hat{g}_b^{code} \cdot c_b(v),$$

the partial derivative, with respect to the gain factors of the synchronization channels, to $$\frac{\partial L}{\partial \hat{g}_\mu^{sync}} = 2\sum_{v=0}^{N-1} |sync_\mu(v)|^2 \cdot \hat{g}_\mu^{sync} + 2\sum_{v=0}^{N-1} REAL\{-sync_\mu(v) \cdot a_3^*(v)\} = 0 \quad (12)$$

with $$a_3(v) = r_{desc}(v) - jr_{desc}(v) \cdot \Delta\hat{\omega} \cdot v - jr_{desc}(v) \cdot \Delta\hat{\phi} - \\ r'_{desc}(v) \cdot \hat{\varepsilon} - \sum_{a=0}^{N_1-1} \hat{g}_a^{sync} \cdot sync_a(v) - \sum_{b=0}^{N_2-1} \hat{g}_b^{code} \cdot c_b(v) \quad (13)$$

and the partial derivatives with respect to the gain factors of the code channels to $$\frac{\partial L}{\partial \hat{g}_\mu^{code}} = 2\sum_{v=0}^{N-1} |c_\mu(v)|^2 \cdot \hat{g}_\mu^{code} + 2\sum_{v=0}^{N-1} REAL\{-c_\mu(v) \cdot a_4^*(v)\} = 0 \quad (14)$$

with $$a_4(v) = r_{desc}(v) = jr_{desc}(v) \cdot \Delta\hat{\omega} \cdot v - jr_{desc}(v) \cdot \Delta\hat{\phi} - \\ r'_{desc}(v) \cdot \hat{\varepsilon} - \sum_{a=0}^{N_1-1} \hat{g}_a^{sync} \cdot sync_a(v) - \sum_{b=0}^{N_2-1} \hat{g}_b^{code} \cdot c_b(v) \quad (15)$$

The equations (12, 13) and the equations (14, 15) are valid for all synchronization channels or for all code channels. The equations (6, 7), (8, 9), (10, 11), (12, 13), (14, 15) can be summarized in a matrix-vector statement:

$$\begin{bmatrix} A_{0,0} & & A_{0,3a} & A_{0,4b} \\ & \ddots & & \\ A_{3a,0} & & A_{3a,3a} & A_{3a,4b} \\ A_{4b,0} & & A_{4b,3a} & A_{4b,4b} \end{bmatrix} \cdot \begin{bmatrix} \Delta\hat{\omega} \\ \Delta\hat{\phi} \\ \hat{\varepsilon} \\ \hat{g}_a^{sync} \\ \hat{g}_b^{code} \end{bmatrix} = \begin{bmatrix} b_0 \\ \vdots \\ b_{3a} \\ b_{4b} \end{bmatrix} \quad (16)$$

whereby, the coefficients of the first row come to:

$$b_{a=0} \quad (17)$$

$$A_{0,0} = \sum_v |r_{desc}(v)|^2 \cdot v^2 \quad (18)$$

$$A_{0,1} = \sum_v |r_{desc}(v)|^2 \cdot v \quad (19)$$

$$A_{0,2} = \sum_v REAL\{j \cdot r_{desc}(v) \cdot r'^*_{desc}(v) \cdot v\} \quad (20)$$

$$A_{0,3a} = \sum_v REAL\{j \cdot r_{desc}(v) \cdot v \cdot sync_a^*(v)\} \quad (21)$$

$$A_{0,4b} = \sum_v REAL\{j \cdot r_{desc}(v) \cdot v \cdot c_b^*(v)\}, \quad (22)$$

The coefficients of the second line show:

$$b_1 = 0 \quad (23)$$

$$A_{1,0} = \sum_v |r_{desc}(v)|^2 \cdot v \quad (24)$$

$$A_{1,1} = \sum_v |r_{desc}(v)|^2 \quad (25)$$

$$A_{1,2} = \sum_v REAL\{j \cdot r_{desc}(v) \cdot r'^*(v)\} \quad (26)$$

$$A_{1,3a} = \sum_v REAL\{j \cdot r_{desc}(v) \cdot sync_a^*(v)\} \quad (27)$$

$$A_{1,4b} = \sum_v REAL\{j \cdot r_{desc}(v) \cdot c_b^*(v)\}, \quad$$

The coefficients of the third row show:

$$b_2 = \sum_v REAL\{r'_{desc}(v) \cdot r^*_{desc}(v)\} \quad (29)$$

$$A_{2,0} = \sum_v REAL\{-j \cdot r'_{desc}(v) \cdot r^*_{desc}(v) \cdot v\} \quad (30)$$

$$A_{2,1} = \sum_v REAL\{-j \cdot r'_{desc}(v) \cdot r^*_{desc}(v)\} \quad (31)$$

$$A_{2,2} = \sum_v |r'_{desc}(v)|^2 \quad (32)$$

$$A_{2,3a} = \sum_v REAL\{r'_{desc}(v) \cdot sync_a^*(v)\} \quad (33)$$

$$A_{2,4b} = \sum_v REAL\{r'_{desc}(v) \cdot c_b^*(v)\}, \quad (34)$$

Figure 4:
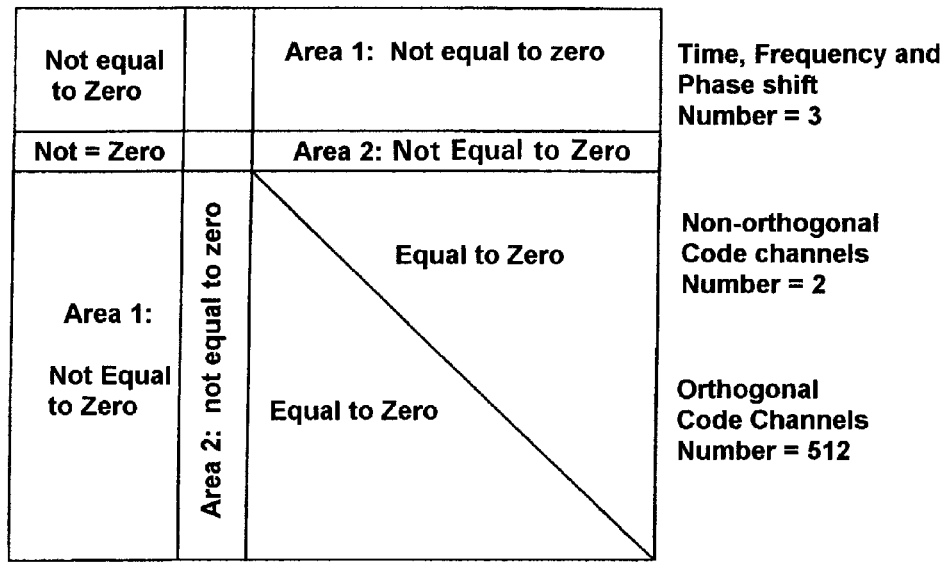
FIG. 4 is a schematic presentation to exhibit the structure of a coefficient matrix required by the numerical solution.

The coefficients of the fourth row show, $$b_{3a} = \sum_v REAL\{sync_a(v) \cdot r^*_{desc}(v)\} \quad (35)$$

$$A_{3a,0} = \sum_v REAL\{-sync_a(v) \cdot j \cdot r^*_{desc}(v) \cdot v\} \quad (36)$$

$$A_{3a,1} = \sum_v REAL\{-sync_a(v) \cdot j \cdot r^*_{desc}(v)\} \quad (37)$$

$$A_{3a,2} = \sum_v REAL\{sync_a(v) \cdot r'^*_{desc}(v)\} \quad (38)$$

$$A_{3a,3\mu} = \sum_v REAL\{sync_a(v) \cdot sync_\mu^*(v)\} \quad (39)$$

$$A_{3a,4b} = \sum_v REAL\{sync_a(v) \cdot c_b^*(v)\} \quad (40)$$

and the coefficients of the fifth row are $$b_{4b} = \sum_v \text{REAL}\{c_b(v) \cdot r^*_{desc}(v)\} \quad (41)$$

$$A_{4b,0} = \sum_v \text{REAL}\{-c_b(v) \cdot j \cdot r^*_{desc}(v) \cdot v\} \quad (42)$$

$$A_{4b,1} = \sum_v \text{REAL}\{-c_b(v) \cdot j \cdot r^*_{desc}(v)\} \quad (43)$$

$$A_{4b,2} = \sum_v \text{REAL}\{c_b(v) \cdot r'^*_{desc}(v)\} \quad (44)$$

$$A_{4b,3a} = \sum_v \text{REAL}\{c_b(v) \cdot sync^*_a(v)\} \quad (45)$$

$$A_{4b,4\mu} = \sum_v \text{REAL}\{c_b(v) \cdot c^*_\mu(v)\} \quad (46)$$

to the codes of the synchronization channels. Because of the orthogonal characteristic of the code channels, the coefficients $A_{4b,4\mu}$ for $b=\mu$ equal zero. The structure of the matrix A is presented in FIG. 4.

For the computation of the coefficients:

$A_{0\ 4b}, A_{1\ 4b}, A_{2\ 4b}, A_{3a,4b}, A_{4b,0}, A_{4b,1}, A_{4b,2}, A_{4b,3a}$ and $b_{4b}$ correlation products of the form:

$$R_{x,c} = \sum_v \text{REAL}\{x(v) \cdot [c_b(v)]^*\} \quad (47)$$

must be computed, whereby the signal x(v) can be one of the following: x(v)=r(v), c(v)=r'(v) or x(v)=sync(v). The direct calculation of this correlation would have a high numerical complexity.

The algorithms for the estimation of all unknown parameters can be implemented with a reduced numerical complexity, in case the gain factors of a plurality of code channels must be estimated. In this case, the Fast Hadamard-Transformation for the computation of the coefficients $A_{0,4b}$, $A_{1,4b}, A_{2,4b}, A_{3a,4b}, A_{3a,4b}, A_{4b,0}, A_{4b,1}, A_{4b,2}, A_{4b3a}$ and $b_{4b}$ can be efficiently employed.

The capacity normalized, unscrambled, undistorted chip signal $c_b(l \cdot SF_b + v) - r_b(l) \cdot w_b(v)$ (48) of a code/channel emerges from the spreading of the symbol $r_b(l)$ of the code channel with its spreading code $w_b(v)$. The magnitude of $SF_b$ presents the spreading factor of the code channel.

The equation (47) and the equation (48) can be brought together in the expression:

$$R_{x,c} = \sum_l \text{REAL}\{[r_b(l)]^* \cdot \sum_v x(l \cdot SF_b + v) \cdot w_b(v)\} = \quad (49)$$

$$\sum_l \text{REAL}\{[r_b(l)]^* \cdot x_b(l)\}$$

The inner sum from equation (49) can now be computed efficiently for all codes in a code class with the Fast Hadamard-Transformation, so that the cross-correlation-coefficients now need only to be computed on the symbol plane.

Figure 5:
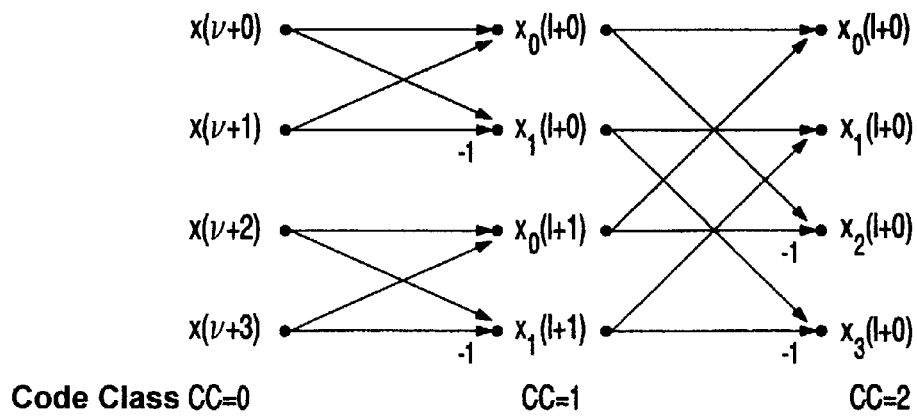
FIG. 5 is a signal-flow-graph, which, with the Fast Hadamard-Transformation employed by the invented procedure, in natural form.

In FIG. 5 is presented the signal flow sheet of a Fast Hadamard-Transformation of the natural form of the length four. The chip-signal x(v) transformed in the first stage of the transformation in the code class CC=1. The results in the first stage of the transformation, $x_0(1+0), x_1(1+0), x_0(1+1)$ and $x_1(1+1)$, represent the inner sum of the equation 49 for the code channels, which the spreading codes from the code class CC=1 employ. In the second stage of the transformation, one obtains the results of the inner summation of equation (49) for the code channels, which the spreading code uses from the code class CC=2.

The numerical complexity lessens, because, first, the Fast Hadamard-Transformation possesses a complexity of M·log M in comparison to the complexity of the direct computation with equation (49) of $M^2$. Further, in the computation of the inner summation of equation (49) only two real value signals must be considered, and it need not, as is the case with the direct computation from equation (47) be carried out by computations with complex valued signals.

While the invention has been described in detail and with reference to specific examples thereof, it will be apparent to one skilled in the art that various changes and modifications can be made therein without departing from the spirit and scope thereof.

What is claimed is:

1. A process for estimating unknown parameters ($\Delta\omega, \Delta\phi, \epsilon, \ldots$) of a CDMA signal ($r_{desc}(v)$). which is sent by means of a transmission channel, in which the CDMA-signal has experienced changes of the parameters ($\Delta\omega, \Delta\phi, \epsilon, \ldots$), the process comprising:

receiving the CDMA signal ($r_{desc}(v)$) having unknown parameters ($\Delta\omega, \Delta\phi, \epsilon, \ldots$);

forming of a cost function (L), which is dependent on estimated values ($\Delta\omega, \Delta\phi, \epsilon, \ldots$) of combined unknown parameters ($\Delta\omega, \Delta\phi, \epsilon, \ldots$), partial differentiating of the cost function in respect to the estimate values ($\Delta\omega, \Delta\phi, \epsilon, \ldots$) of the unknown parameters ($\Delta\omega, \Delta\phi, \epsilon, \ldots$), forming of a matrix-vector-equation computing of at least some of the matrix elements of the matrix-vector-equation with a Fast-Hadamard-Transformation; and conveying the computed matrix elements to interpret the received CDMA signal.

2. The process of claim 1, wherein:

the CDMA-signals are summed from chip-signals $c_b(v)$ of a plurality of code channels, which, are multiplied by different, orthogonal spreading codes $w_b(v)$ and different gain factors $g_b^{code}$, plus at least one chip-signal $sync_a(v)$, from at least one synchronization channel, which is multiplied by a gain factor $g_a^{sync}$, and unknown parameters of the received CDMA signal are: the time shift $\epsilon$, the frequency shift $\Delta\omega$, the phase shift $\Delta\phi$ and the gain factors $g_b^{code}$ and $g_a^{sync}$ of the code channels and the at least one synchronization channels.

3. The process of claim 2, wherein the chip-signal $sync_a(v)$ of each synchronization channel is unscrambled.

4. The process of claim 2, wherein the following cost function $L_1$ is formed:

$$L_1(\Delta\tilde{\omega}, \Delta\tilde{\phi}, \tilde{\varepsilon}, \tilde{g}_a^{sync}, \tilde{g}_b^{code}) =$$

$$\sum_{v=0}^{N-1} \left| r_{desc}(v-\tilde{\varepsilon}) \cdot e^{-j\Delta\tilde{\omega}v} \cdot e^{-j\Delta\tilde{\phi}} - \sum_{a=0}^{N_1-1} \tilde{g}_a^{sync} \cdot sync_a(v) - \sum_{b=0}^{N_2-1} \tilde{g}_b^{code} \cdot c_b(v) \right|^2.$$

5. The process of claim 4, wherein the cost function $L_1$, by means of series development of a first order is transposed into the following linearized cost function L:

$$L(\Delta\tilde{\omega}, \Delta\tilde{\phi}, \tilde{\varepsilon}, \tilde{g}_a^{sync}, \tilde{g}_b^{code}) =$$

$$\sum_{v=0}^{N-1} \left| r_{desc}(v) - jr_{desc}(v) \cdot \Delta\tilde{\omega} \cdot v - jr_{desc}(v) \cdot \Delta\tilde{\phi} - r'_{desc}(v) \cdot \tilde{\varepsilon} - \sum_{a=0}^{N_1-1} \tilde{g}_a^{sync} \cdot sync_a(v) - \sum_{b=0}^{N_2-1} \tilde{g}_b^{code} \cdot c_b(v) \right|^2.$$

6. The process of claim 5, wherein the linearized cost function L is differentiated with respect to the time shift $\epsilon$, the frequency shift $\Delta\omega$, the phase shift $\Delta\phi$ as well as with respect to the gain factors $g_b^{code}$ and $g_a^{sync}$ and thereby an equation system is obtained, which can be expressed in matrix form as follows:

$$\begin{bmatrix} A_{0,0} & & A_{0,3a} & A_{0,4b} \\ & \ddots & & \\ A_{3a,0} & & A_{3a,3a} & A_{3a,4b} \\ A_{4b,0} & & A_{4b,3a} & A_{4b,4b} \end{bmatrix} \cdot \begin{bmatrix} \Delta\hat{\omega} \\ \Delta\hat{\phi} \\ \hat{\varepsilon} \\ \hat{g}_a^{sync} \\ \hat{g}_b^{code} \end{bmatrix} = \begin{bmatrix} b_0 \\ \vdots \\ b_{3a} \\ b_{4b} \end{bmatrix}.$$

7. The process of claim 6, wherein the computation of the coefficients: $A_{0,4b}, A_{1,4b}, A_{2,4b}, A_{3a,4b}, A_{ab,0}, A_{ab,1}, A_{ab,2}, A_{4b,3a}$ and $b_{4b}$ the following equation is solved:

$$R_{x,c} = \sum_l REAL\left\{[r_b(l)]^* \cdot \sum_v x(l \cdot SF_b + v) \cdot w_b(v)\right\} = \sum_l REAL\{[r_b(l)]^* \cdot x_b(l)\}.$$

8. The process of claim 7, wherein an inner sum of the equation:

$$R_{x,c} = \sum_l REAL\left\{[r_b(l)]^* \cdot \sum_v x(l \cdot SF_b + v) \cdot w_b(v)\right\} = \sum_l REAL\{[r_b(l)]^* \cdot x_b(l)\}$$

is computed for all codes in a code class with the Fast Hadamard-Transformation.

9. A computer program with a program code for executing the process of claim 1 when the program is run in a computer.

10. A computer program with a program code stored on a machine-readable carrier for executing the process of claim 1 when the program is run in a computer.

11. The process of claim 1, wherein the matrix-vector-equation is formed based on a presupposition that all partial differentials of the cost function are zero.

* * * * *